United States Patent [19]

Phillips

[11] 4,246,526
[45] Jan. 20, 1981

[54] CONTROL CIRCUIT FOR A MOTOR DRIVEN AUTOMATIC VALVE

[75] Inventor: Edward G. Phillips, Colne, England

[73] Assignee: Lucas Industries Limited, Birmingham, England

[21] Appl. No.: 84,191

[22] Filed: Oct. 12, 1979

[30] Foreign Application Priority Data

Oct. 18, 1978 [GB] United Kingdom ............... 41098/78

[51] Int. Cl.³ ............................................. G05G 5/00
[52] U.S. Cl. .................................. 318/626; 318/466; 318/286
[58] Field of Search ............... 318/467, 468, 469, 626, 318/286, 432, 434, 466

[56] References Cited

U.S. PATENT DOCUMENTS

| | | | |
|---|---|---|---|
| 3,633,088 | 1/1972 | Kupersmith | 318/626 |
| 3,668,496 | 6/1972 | Markowitz et al. | 318/486 X |
| 4,087,728 | 5/1978 | Porter | 318/626 X |

*Primary Examiner*—B. Dobeck

[57] ABSTRACT

A motor driven valve control circuit includes an electronic switch element biased to conduct by a resistor connected by diodes to both poles of a switch. A relay controlled by one pole of the switch determines the direction of connection of the motor in series with the element. A thyristor connected to shunt the bias current away from the switch element is gated by a voltage comparator comparing the voltage across a motor current sensing element with a reference voltage, so as to fire the thyristor when the motor current exceeds a set limit. The circuit eliminates the need for latching limit switches usually employed in motor driven valve controls.

6 Claims, 1 Drawing Figure

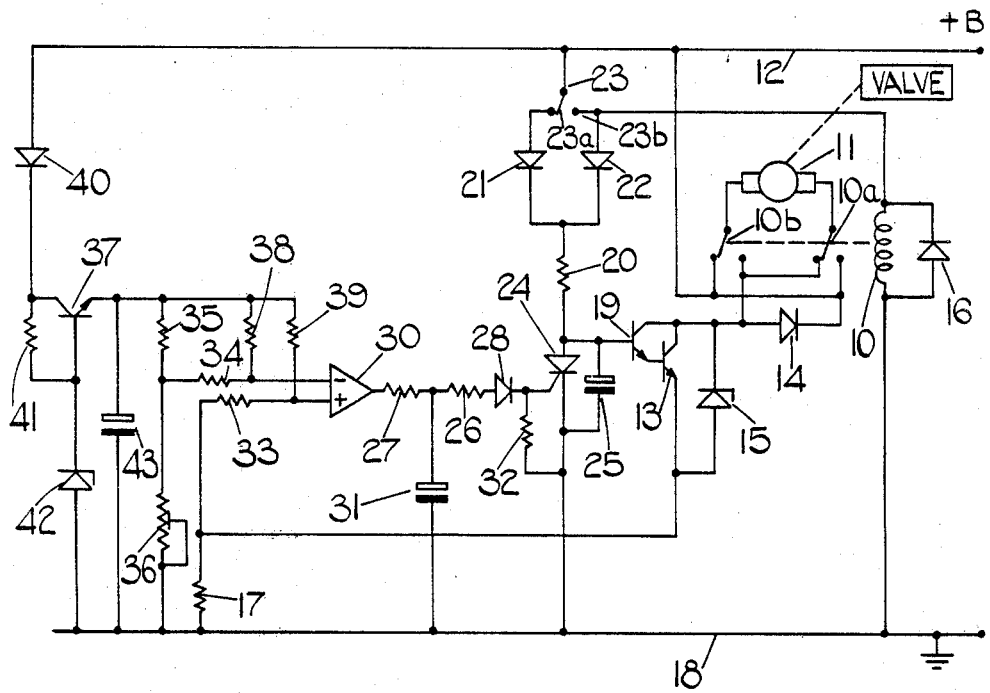

CONTROL CIRCUIT FOR A MOTOR DRIVEN AUTOMATIC VALVE

This invention relates to a control circuit for a motor driven automatic valve, such as a shut off valve for use in the fuel system of a road vehicle.

In the past it has been proposed to control the valve motor by means of mechanically operated limit switches which operate at the open and closed positions of a valve actuating element so as to de-energise the motor at each end of the travel of the actuating element. This known arrangement has several drawbacks, including the need to adjust the positions of the limit switches accurately to ensure that the valve is properly closed or fully open. Moreover it is customary to utilise the same limit switches to determine the direction of drive of the motor and the switches therefore have to be of the mechanically latching type.

It is an object of the present invention to provide a control circuit which does not rely upon mechanically latching limit switches for its operation.

A control circuit in accordance with the invention comprises relay means having contacts controlling the connection of the motor to determine the direction of running thereof, an electronic switch circuit connected in series with the motor via said contacts, biasing means biasing said electronic switch circuit to a conductive state and limit means sensitive to the motor current for switching said electronic switch means to a non-conductive state when the motor current exceeds a predetermined level, said limit means including an electronic latching circuit for maintaining said electronic switch means non-conductive after said motor current has exceeded said predetermined level.

Preferably said limit means includes a motor current sensing element and a voltage comparator connected to compare the voltage across said sensing element with a predetermined voltage.

The latching circuit may comprise a thyristor with its gate connected to the voltage comparator output and its anode-cathode path connected to shunt the output current of the biasing means past the electronic switching circuit.

Preferably the connection between the voltage comparator and the gate of the thyristor includes delay means for preventing firing of the thyristor by transient motor current peaks for example during starting of the motor.

An example of a control circuit in accordance with the invention is shown in the sole FIGURE of the accompanying drawing.

As shown in the drawing the circuit includes a relay 10 with two change-over contacts 10a, 10b connected to the motor 11 so that when the relay 10 is de-energised one side of the motor is connected to a positive supply 12 and the other side is connected to the collector of an output transistor 13 of an electronic switching circuit controlling the motor current. In the energised state of the relay 10, said other side of the motor 11 is connected to the supply 12 and said one side is connected to the collector of output transistor 13. For protection purposes a recirculation diode 14 is connected between the supply 12 of the collector of the transistor 13 and a zener diode 15 is connected across the collector-emitter of the transistor 13. A further recirculation diode 16 is connected across the relay winding 10.

The transistor 13 has its emitter connected via a motor current sensing resistor 17 to an earth rail 18. The base of transistor 13 is connected to the emitter of a drive transistor 19 which has its collector connected to the collector of transistor 13 and its base connected to a bias circuit including a resistor 20 which connects the base of the transistor 19 to the cathodes of two diodes 21, 22 which have their anodes connected to two terminals 23a, 23b of the vehicle ignition switch 23. Terminal 23a is connected to the rail 12 when the switch 23 is in its off position and terminal 23b is connected to that rail when the switch 23 is in its on position. Terminal 23b is also connected to one end of the relay winding 10, the other end of which is connected to the rail 18.

The base of the transistor 19 is also connected to the anode of a thyristor 24 which has its cathode connected to the earth rail 18. A capacitor 25 is connected across the thyristor 24. The gate of the thyristor 24 is connected by a diode 28 two resistors 26, 27 in series to the output terminal of an integrated circuit voltage comparator 30, the junction of the resistors 26, 27 being connected by a capacitor 31 to the ground rail 18. A resistor 32 interconnects the gate and cathode of the thyristor 24.

The voltage comparator 30 has its non-inverting input terminal connected by a resistor 33 to the emitter of transistor 13 so that the voltage at the non-inverting input is proportional to the current in the resistor 17. The inverting input terminal of the comparator 30 is connected by a resistor 34 to the junction of a resistor 35 and a variable resistor 36 connected in series between the emitter of a transistor 37 and the ground rail 18. Two further resistors 38, 39 of high ohmic value connect the respective input terminals of the comparator 30 to the emitter of transistor 37.

Transistor 37, provides at its emitter a stablised voltage, its collector being connected to the supply 12 via a diode 40 and its base being connected to its collector by a resistor 41 and to the rail 18 by a zener diode 42. A capacitor 43 is connected between the emitter of the transistor, and earth rail 18.

In use, when the switch 23 is moved to its on position, the relay 10 is energised and the transistors 13, 19 are turned on by bias current flowing via the diode 22 and the resistor 20. The motor 11 runs until the actuating element of the valve which it drives reaches the end of its travel. The motor 11 then stalls and the stall current flowing through the resistor 17 is in excess of a predetermined current level determined by the setting of variable resistor 36. The output of the comparator 30 therefore goes high and following a delay introduced by the resistor 27 and capacitor 31, the thyristor 24 is fired, thereby diverting the bias current away from the transistor 19 and causing the transistors 13, 19 to turn off. Current flowing through the diode 22, the resistor 20 and the thyristor 24, causes the latter to remain conductive as long as the switch 23 is in its on position.

When the switch 23 is moved to its off position, the current flowing through the thyristor 24 is momentarily interrupted so that the thyristor 24 turns off. The transistors 13, 19 can thus turn on again, but as the relay 10 is now de-energised, the motor 11 runs in the opposite direction until it stalls, when the motor current is again stopped as a result of the thyristor 24 being fired.

The resistor 27 and capacitor 31 provide a delay in the firing of the thyristor 24 to prevent spurious operation of the thyristor by transient motor current peaks during starting.

I claim:
1. A control circuit for a motor driven automatic valve, comprising relay means having contacts controlling the connection of the motor to determine the direction of running thereof, an electronic switch circuit connected in series with the motor via said contacts, biasing means biasing said electronic switch circuit to a conductive state and limit means sensitive to the motor current for switching said electronic switch means to a non-conductive state when the motor current exceeds a predetermined level, said limit means including an electronic latching circuit for maintaining said electronic switch means non-conductive after said motor current has exceeded said predetermined level.

2. A control circuit as claimed in claim 1 in which said limit means comprises a motor current sensing element and a voltage comparator connected to compare the voltage across the sensing element with a predetermined voltage.

3. A control circuit as claimed in claim 2 further comprising a transistor voltage stabilizing circuit connected to supply said predetermined voltage to said comparator.

4. A control circuit as claimed in claim 2 or 3 in which said latching circuit comprises a thyristor with its gate connected to the voltage comparator and its anode-cathode path connected to shunt the output current of the biasing means past the electronic switching circuit.

5. A control circuit as claimed in claim 4 in which the connection between the voltage comparator and the gate of the thyristor includes delay means for preventing firing of the thyristor by transient motor current peaks.

6. A control circuit as claimed in claim 4 or 5 in which said biasing means comprises a resistor connected by diodes to both poles of a switch one pole of which is connected to energise the relay, the switch serving to interrupt the current flow through the biasing resistor and the thyristor when it is moved between its on and off positions so as thereby to switch off the thyristor.

* * * * *